(12) United States Patent
Huang et al.

(10) Patent No.: US 11,720,000 B1
(45) Date of Patent: Aug. 8, 2023

(54) 360-DEGREE CAMERA DEVICE HAVING ATMOSPHERE LAMP

(71) Applicant: MARVEL TECHNOLOGY (CHINA) CO., LIMITED, Shenzhen (CN)

(72) Inventors: Hai Huang, Shenzhen (CN); Qing Chi, Shenzhen (CN)

(73) Assignee: MARVEL TECHNOLOGY (CHINA) CO., LIMITED, Shenzhen (CN)

( * ) Notice: Subject to any disclaimer, the term of this patent is extended or adjusted under 35 U.S.C. 154(b) by 0 days.

(21) Appl. No.: 18/098,933

(22) Filed: Jan. 19, 2023

(30) Foreign Application Priority Data

Apr. 29, 2022 (CN) .......................... 202221031966.8

(51) Int. Cl.
*G03B 15/07* (2021.01)
*G03B 15/04* (2021.01)

(52) U.S. Cl.
CPC ......... *G03B 15/07* (2013.01); *G03B 15/0431* (2013.01)

(58) Field of Classification Search
CPC ............................. G03B 15/07; G03B 15/0431
See application file for complete search history.

(56) References Cited

U.S. PATENT DOCUMENTS 2,140,602 A * 12/1938 Simjian ................ G03B 19/023
396/338
9,641,730 B2 * 5/2017 Rosenberry ............ F16M 13/00

* cited by examiner

*Primary Examiner* — Evan P Dzierzynski
*Assistant Examiner* — Nathaniel J Lee
(74) *Attorney, Agent, or Firm* — Daniel M. Cohn; Howard M. Cohn

(57) ABSTRACT

A 360-degree camera device having atmosphere lamp includes a supporting platform, a supporting spindle, a supporting base, and a rotating shooting bracket. The supporting platform includes a first supporting element, a tempered glass, a first light source, and a reflecting mirror. The first supporting element is configured to support the tempered glass. The tempered glass is a single-sided perspective glass including a light-transmitting surface and a reflecting surface. An interval area is disposed between the tempered glass and the reflecting mirror. The reflecting mirror and the reflecting surface are oppositely disposed. The first light source is disposed in the interval area. The first light source is in a shape of graphics and/or characters. The first light source includes a plurality of point-shaped light-emitting parts. The first light source is substantially disposed in an annular shape and disposed along edge contour of the tempered glass or the reflective mirror.

12 Claims, 7 Drawing Sheets

360-DEGREE CAMERA DEVICE HAVING ATMOSPHERE LAMP

TECHNICAL FIELD

The present disclosure relates to a technical field of photographic camera devices, and in particular to a 360-degree camera device having atmosphere lamp.

BACKGROUND

Nowadays, with the development of technologies, photography and videography have become popular, shooting images is no longer a luxury, and selfie is more casual. 360-degree photo booths, also called 360Photobooth, are platforms for 360-degree surround shooting. Compared with ordinary selfies, the 360-degree photo booths have better entertainment experience. Most of users of such products are trendsetters and fashion icons, who have high pursuit and sensitivity to an appearance, a visual impact, and a user experience atmosphere of the products.

However, current 360-degree photo booths merely have a single function and a single shape, which is poor in appearance and user experience.

SUMMARY

The present disclosure provides a 360-degree camera device having atmosphere lamp to solve above technical problems in the background.

In order to achieve above purpose, the present disclosure provides the 360-degree camera device having atmosphere lamp, including a supporting platform, a supporting spindle, a supporting base, and a rotating shooting bracket. The supporting platform includes a first supporting element, a tempered glass, a first light source, and a reflecting mirror. The first supporting element is configured to support the tempered glass. The tempered glass is a single-sided perspective glass including a light-transmitting surface and a reflecting surface. An interval area is disposed between the tempered glass and the reflecting mirror. The reflecting mirror and the reflecting surface are oppositely disposed. The first light source is disposed in the interval area.

Furthermore, the first light source is in a shape of graphics and/or characters.

Furthermore, the first light source includes a plurality of point-shaped light-emitting parts. The first light source is substantially disposed in an annular shape and disposed along edge contour of the tempered glass or the reflecting mirror.

Furthermore, the supporting platform includes a second supporting element. The second supporting element is configured to support a center position of the tempered glass. The first supporting element is configured to support an edge position of the tempered glass.

Furthermore, the supporting platform includes a third supporting element, and the third supporting element is connected with the first supporting element and the second supporting element. The third supporting element is configured to support the reflecting mirror.

Furthermore, the supporting platform includes a first connecting element. The first connecting element is detachably connected to the first supporting element. The first connecting element is configured to fasten connection between the tempered glass and the first supporting element.

Furthermore, the 360-degree camera device further includes a second light source. The second light source includes a plurality of point-shaped light-emitting parts. The second light source is disposed in the interval area. The second light source is substantially disposed in an annular shape and is disposed along an outer wall of the second supporting element.

Furthermore, the 360-degree camera device further include a third light source. The third light source includes a plurality of point-shaped light-emitting parts. The third light source is substantially disposed in an annular shape and is disposed along an outer wall of the first connecting element.

Furthermore, the 360-degree camera device further include a fourth light source. A first end of the supporting spindle is connected to the supporting platform. A second end of the supporting spindle is connected to the supporting base. The fourth light source includes a plurality of point-shaped light-emitting parts. The fourth light source is substantially disposed in an annular shape and is disposed along an outer wall of the supporting base.

Furthermore, an external thread is disposed on one end of the supporting spindle. The supporting platform includes a connecting part connected and matched with the external thread. A threaded through hole is defined in the connecting part. A locking screw penetrates through the threaded through hole and abuts against an outer wall of the external thread to fasten connection between the supporting platform and the supporting spindle.

Furthermore, the supporting base includes a supporting ring and a supporting rod. The supporting rod is connected to the supporting ring. A connecting groove is defined on one end of the supporting spindle. The connecting groove is capable of being clamped with the supporting rod. The supporting rod and the supporting spindle are welded and connected, along a position where the supporting rod is clamped with the supporting spindle.

Furthermore, the camera device further includes a bearing, a transmission element, a clamping spring, a second connecting element, and a stop key. An inner ring of the bearing is sleeved on an outer wall of the supporting spindle. The transmission element is sleeved on an outer ring of the bearing. The bearing includes a first connecting groove and a second connecting groove. The clamping spring and the second connecting element are respectively connected with the first connecting groove and the second connecting groove. The transmission element is clamped and fixed between the clamping spring and the second connecting element. A key groove is defined between the bearing and the transmission element. The stop key is disposed in the key groove. The stop key is limited between the clamping spring and the second connecting element.

Compared with prior art, the present disclosure provides the 360-degree camera device having atmosphere lamp, the first light source is turned on to enable the first light source to emit light, since the first light source is disposed in the interval area, between the reflecting surface of the tempered glass and the reflecting mirror, the light of the first light source is refracted by both the reflecting mirror and the reflecting surface, the light of the first light source is reflected layer by layer, so that when users, who stand beside the 360-degree camera device, observe the supporting platform through the light-transmitting surface of the tempered glass, visual effects that special and personalized multi-layer lamplight gradually disappears are visually provided to the users, therefore providing a lot of fun for the users when shooting. The tempered glass is mainly provided for the users to stand, and the tempered glass has a firm supporting structure, which brings safety and reliability to the users when using the 360-degree camera device. In addition, the tempered glass has a transparent and light-transmitting effect. The tempered glass is further selected as the single-sided perspective glass, which is further called a bidirectional mirror. One side of the tempered glass reflects most of the projected light back, which achieves an effect that the light-transmitting surface side cannot be seen on the reflecting surface side of the tempered glass, and the reflecting surface side can be seen on the light-transmitting surface side of the tempered glass. The single-sided perspective tempered glass is matched with the reflecting mirror and the first light source, so that the light of the first light source has an effect of infinitely extending tunnel and gradually fading away, thus improving experience of using the 360-degree camera device of the users.

Figure 1:
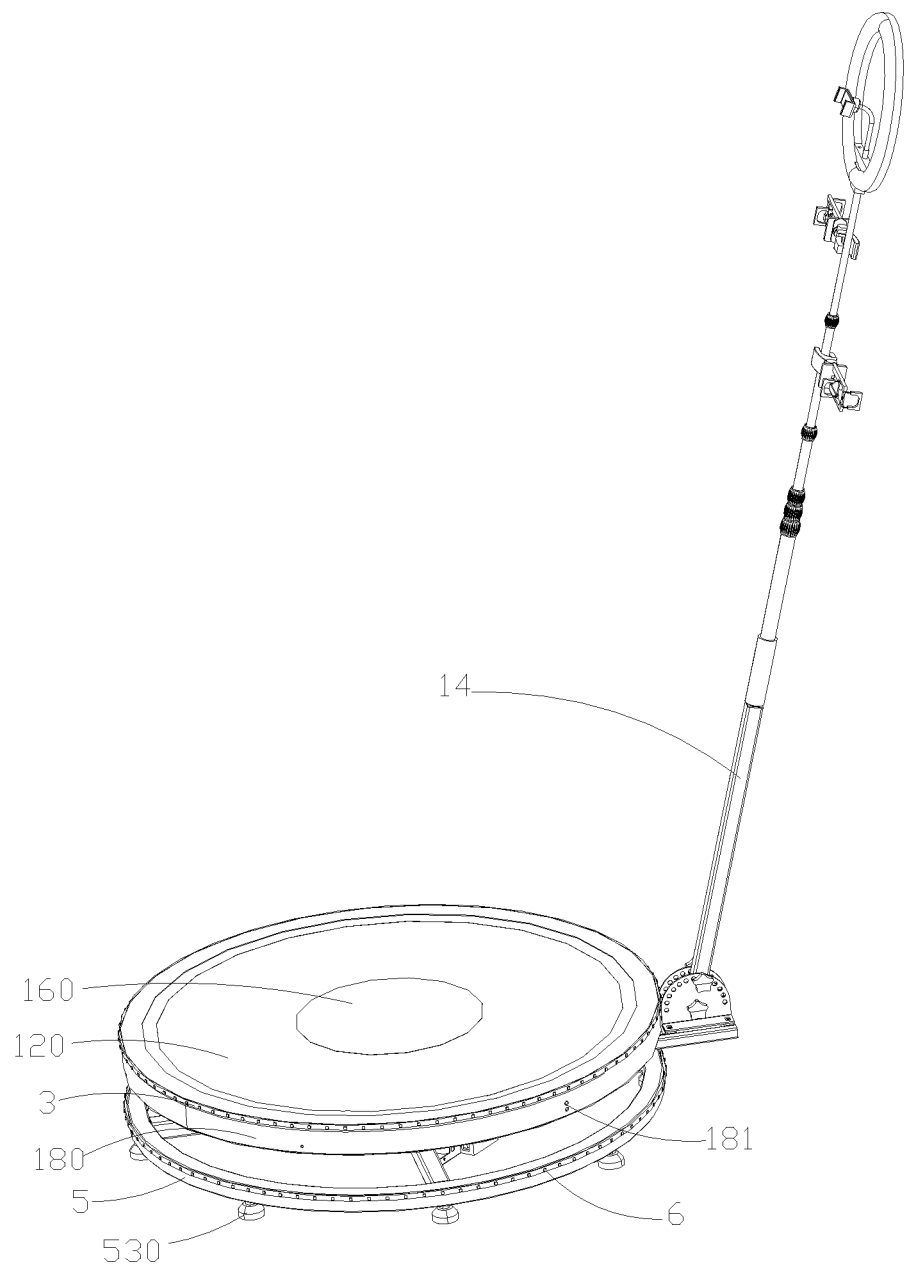
FIG. 1 is a total assembly structural schematic diagram of a 360-degree camera device having atmosphere lamp according to one embodiment of the present disclosure.

Reference numerals in the drawings: 1. supporting platform; 110. first supporting element; 111. second connecting hole; 120. tempered glass; 121. light-transmitting surface; 122. reflecting surface; 130. first light source; 140. reflecting mirror; 150. interval area; 160. second supporting element; 161. connecting part; 162. threaded through hole; 170. third supporting element; 180. first connecting element; 181. first connecting hole; 2. second light source; 3. third light source; 4. supporting spindle; 410. connecting groove; 420. external thread; 5. supporting base; 510. supporting ring; 520. supporting rod; 530. adjustable foot cup; 6. fourth light source; 7. bearing; 710. first connecting groove; 720. second connecting groove; 8. transmission element; 9. clamping spring; 10. second connecting element; 1010. third connecting hole; 11. stop key; 12. key groove; 14. rotating shooting bracket.

DETAILED DESCRIPTION

Referring to FIGS. 1-11, the present disclosure provides the 360-degree camera device having atmosphere lamp, including a supporting platform 1, a supporting spindle 4, a supporting base 5, and a rotating shooting bracket 14. The supporting platform 1 includes a first supporting element 110, a tempered glass 120, a first light source 130, and a reflecting mirror 140. The first supporting element 110 is configured to support the tempered glass 120. The tempered glass 120 is a single-sided perspective glass including a light-transmitting surface 121 and a reflecting surface 122. An interval area 150 is disposed between the tempered glass 120 and the reflecting mirror 140. The reflecting mirror 140 and the reflecting surface 122 are oppositely disposed. The first light source 130 is disposed in the interval area 150.

The first light source 130 is turned on to enable the first light source 130 to emit light, since the first light source 130 is disposed in the interval area 150, between the reflecting surface 122 of the tempered glass 120 and the reflecting mirror 140, the light of the first light source 130 is refracted by the reflecting mirror 140 and the reflecting surface 122, the light of the first light source 130 is reflected layer by layer, so that when users, who stand beside the 360-degree camera device, observe the supporting platform 1 through the light-transmitting surface 121 of the tempered glass 120, visual effects that special and personalized multi-layer lamp-light gradually disappears are visually provided to the users, therefore providing a lot of fun for the users when shooting.

The tempered glass 120 is mainly provided for the users to stand, and the tempered glass 120 has a firm supporting structure, which brings safety and reliability to the users when using the 360-degree camera device. In addition, the tempered glass 120 has a transparent and light-transmitting effect. The tempered glass 120 is further selected as the single-sided perspective glass, which is further called a bidirectional mirror. One side of the tempered glass 120 reflects most of the projected light back, which achieves an effect that the light-transmitting surface 121 side cannot be seen on the reflecting surface 122 side of the tempered glass 120, and the reflecting surface 122 side can be seen on the light-transmitting surface 121 side of the tempered glass 120. The single-sided perspective tempered glass 120 is matched with the reflecting mirror 140 and the first light source 130, so that the light of the first light source 130 has an effect of infinitely extending tunnel and gradually fading away, thus improving experience of atmosphere when using the 360-degree camera device of the users, enhancing excitement of the users, and improving view and admire experience when using the 360-degree camera device.

The above lighting effect further makes user visually feel an overall thickness of the supporting platform 1, so that the users may psychologically feel that the 360-degree camera device is highly safe and reliable.

An area of the tempered glass 120 and the reflecting mirror 140 and a distance between the tempered glass 120 and the reflecting mirror 140 determine a number of layers that the reflecting mirror 140 and the reflecting surface 122 reflects the light of the first light source 130, where the distance between the tempered glass 120 and the reflecting mirror 140 is a longitudinal space of the interval area 150.

In some embodiments, the first light source 130 includes a point-shaped light source with lamp beads, or a hidden light source without lamp beads.

The rotating shooting bracket 14 is controlled by a controller. The controller drives a driving assembly to realize a circumferential rotation of the rotating shooting bracket 14 around the supporting platform 1. The rotating shooting bracket 14 is configured to connect and install shooting equipment, such as clamping and erecting the shooting equipment. The shooting equipment includes a mobile phone holding bracket, a camera, a fill light, and other equipment.

Optionally, the first light source 130 is in a shape of graphics and/or characters.

The first light source 130 has a shape of graphics. The shape of graphics includes, but is not limited to a star, a circle, a wavy line.

Figure 2:
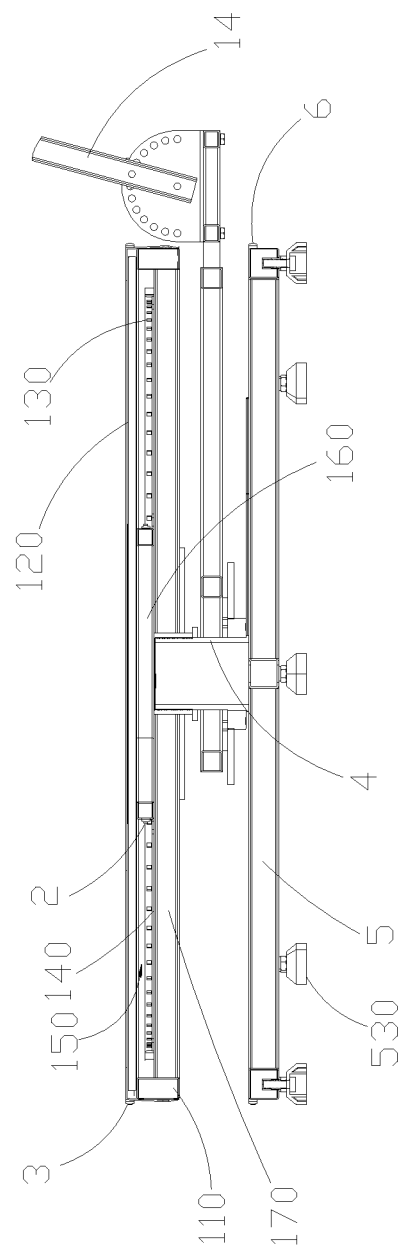
FIG. 2 is a cross-sectional schematic diagram of the 360-degree camera device having atmosphere lamp according to one embodiment of the present disclosure.
Figure 3:
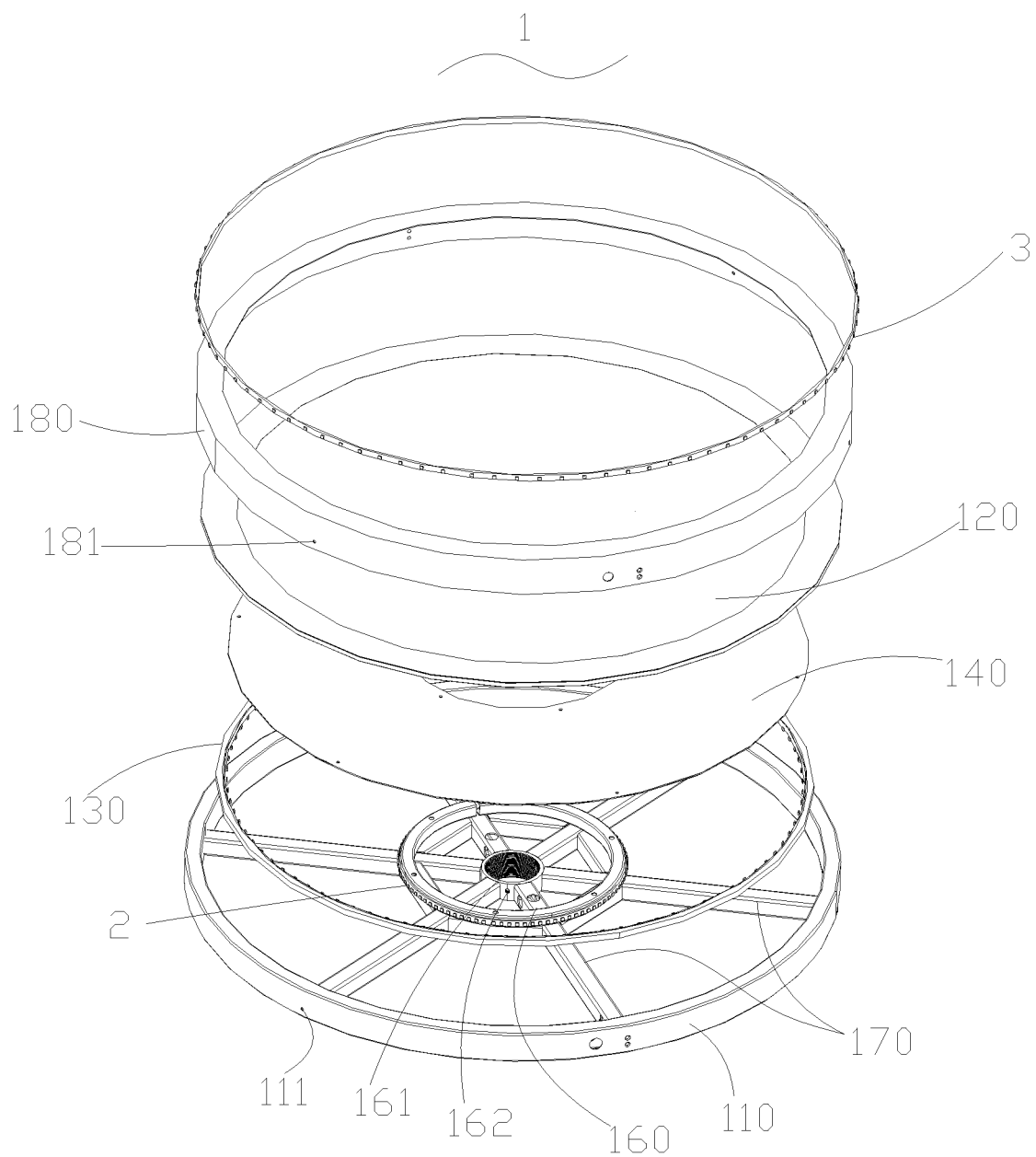
FIG. 3 is an exploded structural schematic diagram of a supporting platform of the 360-degree camera device having atmosphere lamp according to one embodiment of the present disclosure.
Figure 4:
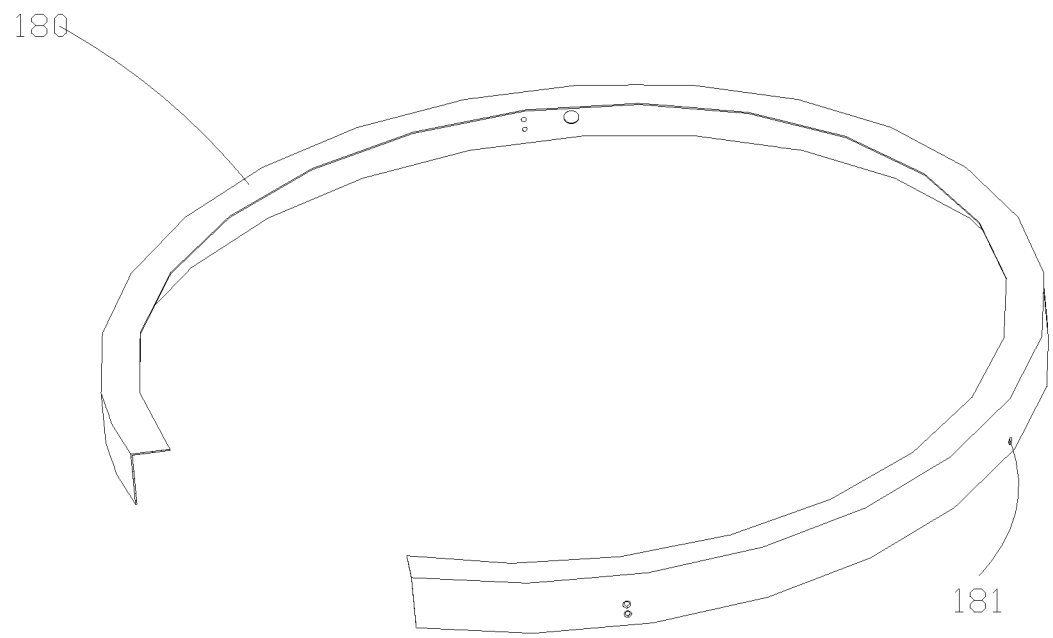
FIG. 4 is a sectional schematic diagram of a first connecting element of the 360-degree camera device having atmosphere lamp according to one embodiment of the present disclosure.
Figure 5:
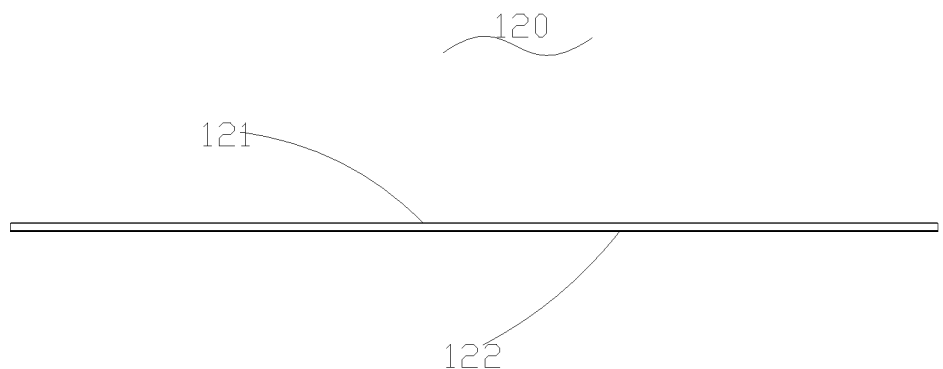
FIG. 5 is a side schematic diagram of a tempered glass of the 360-degree camera device having atmosphere lamp according to one embodiment of the present disclosure.

Referring to FIGS. 1-3, the first light source 130 includes a plurality of point-shaped light-emitting parts. The first light source 130 is substantially disposed in an annular shape and disposed along edge contour of the tempered glass 120 or the reflective mirror 140.

In some embodiments, the plurality of the point-shaped light-emitting parts of the first light source 130 are LED or OLED lamp beads, which serve as point light sources. After the first light source 130 is powered on, the plurality of the LED or OLED lamp beads emit light at the same time, the light is refracted together by the reflecting surface 122 of the tempered glass 120 and the reflecting mirror 140, the light emit by the point light sources is reflected layer by layer, and the gradual disappearing effect of special and personalized multi-layer light is visually provided. Furthermore, as the first light source 130 is in the annular shape, a ring-shaped atmosphere of the first light source 130 is formed to emit light, which makes users feel fantastic atmosphere effect with special visual impact and infinite illusion and feel that dots of light seem to recede to infinity, therefore creating a deep light tunnel effect with fantastic atmosphere experience.

Referring to FIGS. 1-3, the supporting platform 1 includes a second supporting element 160. The second supporting element 160 is configured to support a center position of the tempered glass 120. The first supporting element 110 is configured to support an edge position of the tempered glass 120.

Through this design, the tempered glass 120 gets a uniform supporting force, so that the supporting platform 1 has a stable and reliable support for the users to stand on the tempered glass 120, and a service life of the tempered glass 120 is prolonged.

In some embodiments, the first supporting element 110 is substantially of an annular supporting beam structure conforming to an outer edge contour of the tempered glass 120, and the second supporting element 160 is substantially of a disc-shaped framework structure.

Referring to FIGS. 1-3, the supporting platform 1 includes a third supporting element 170, and the third supporting element 170 is connected with the first supporting element 110 and the second supporting element 160. The third supporting element 170 is configured to support the reflecting mirror 140.

In some embodiments, the third supporting element 170 is generally a supporting beam structure.

Referring to FIGS. 1-4, the supporting platform 1 includes a first connecting element 180. The first connecting element 180 is detachably connected to the first supporting element 110. The first connecting element 180 is configured to fasten connection between the tempered glass 120 and the first supporting element 110.

In some embodiments, the tempered glass 120 and the first supporting element 110 are connected in an adhesive manner.

In order to improve maintainability of the 360-degree camera device, the first connecting element 180 is detachably connected to the first supporting element 110 to fasten the connection between the tempered glass 120 and the first supporting element 110, or after the first connecting element 180 and the first supporting element 110 are disconnected, the tempered glass 120 is conveniently separated from the first supporting element 110 for maintenance and replacement.

In some embodiments, a cross-section of the first connecting element 180 is substantially in an "L" shape. Two extension ends of the first connecting element 180 are respectively in contact with the first supporting element 110 and the tempered glass 120. The first connecting element 180 and the first supporting element 110 respectively include a first connecting hole 181 and a second connecting hole 111. The first connecting hole 181 and the second connecting hole 111 are penetrated by screws to fasten connection of the tempered glass 120 and the first supporting element 110. The first connecting element 180 further plays a role of edge wrapping decoration to a certain extent.

Referring to FIGS. 2-3, the 360-degree camera device further includes a second light source 2. The second light source 2 includes a plurality of point-shaped light-emitting parts. The second light source 2 is disposed in the interval area 150. The second light source 2 is substantially disposed in an annular shape and is disposed along an outer wall of the second supporting element 160.

The second light source 2 is the same as the first light source 130, the light is refracted together by the reflecting surface 122 of the tempered glass 120 and the reflecting mirror 140, the light emit by the point light sources is reflected layer by layer, and the gradual disappearing effect of special and personalized multi-layer light is visually provided. Furthermore, as the second light source 2 is in the annular shape, a ring-shaped atmosphere of the second light source 2 is formed to emit light, which makes users feel fantastic atmosphere effect with special visual impact and infinite illusion and feel that dots of light seem to recede to infinity, therefore creating a deep light tunnel effect with fantastic atmosphere experience.

Referring to FIGS. 1-3, the 360-degree camera device further include a third light source 3. The third light source 3 includes a plurality of point-shaped light-emitting parts. The third light source 3 is substantially disposed in an annular shape and is disposed along an outer wall of the first connecting element 180.

The third light source 3 plays a decorative role on the supporting platform 1.

Figure 6:
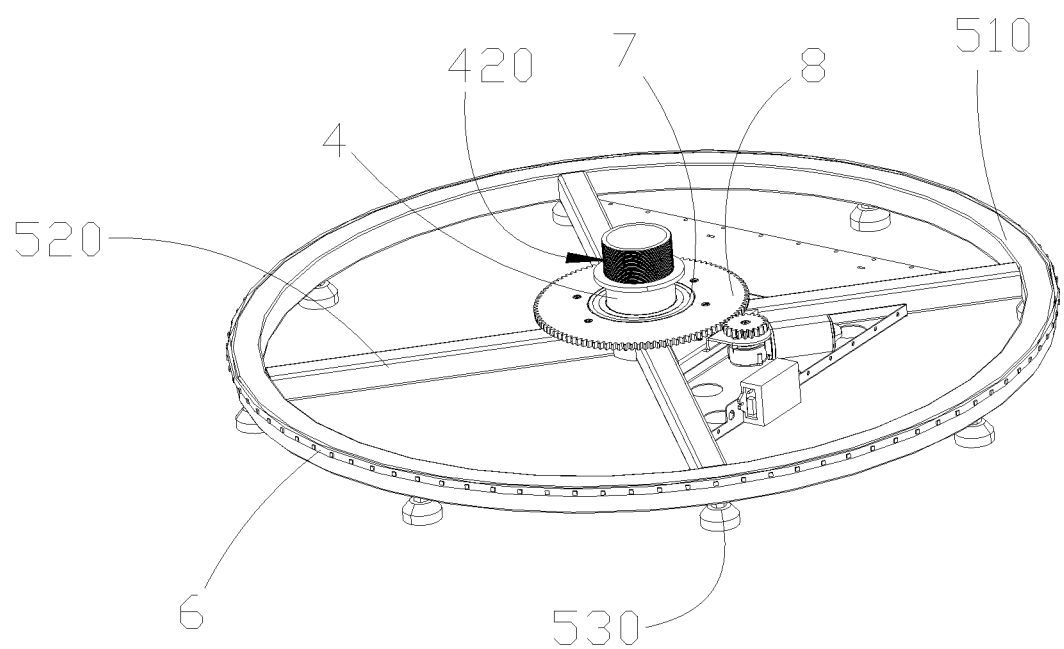
FIG. 6 is a structural schematic diagram of the 360-degree camera device having atmosphere lamp after the supporting platform is removed according to one embodiment of the present disclosure.
Figure 7:
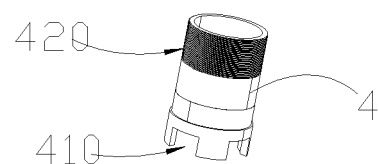
FIG. 7 is an exploded structural schematic diagram of a supporting base and a supporting spindle of the 360-degree camera device having atmosphere lamp according to one embodiment of the present disclosure.
Figure 7:
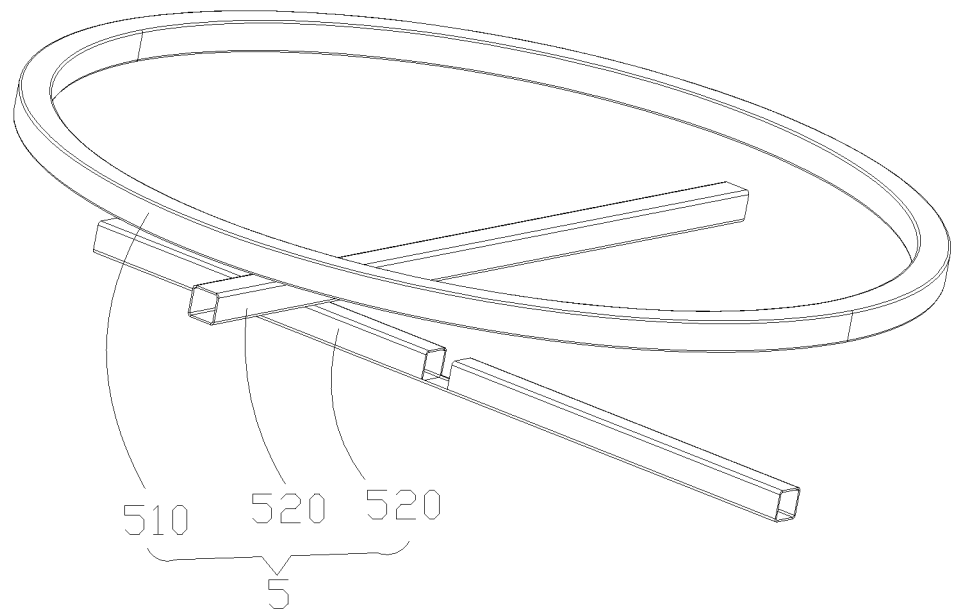
Figure 8:
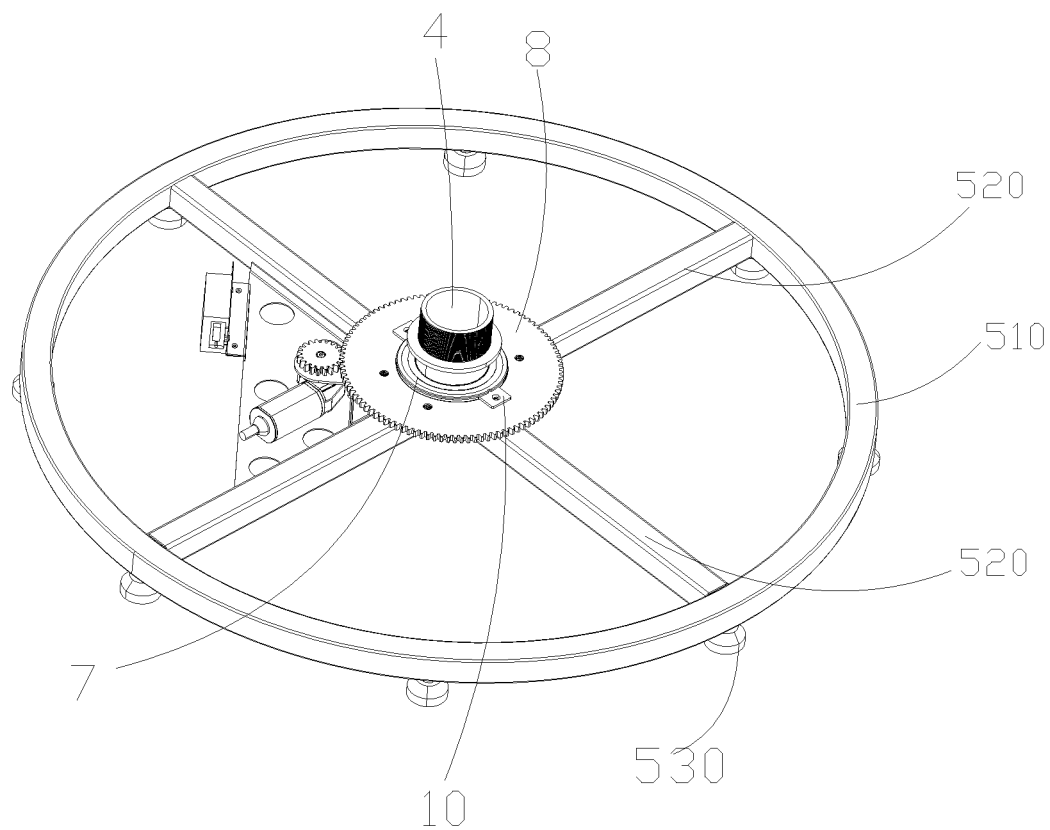
FIG. 8 is a structural schematic diagram of the 360-degree camera device having atmosphere lamp after the supporting platform is removed according to one embodiment of the present disclosure.
Figure 9:
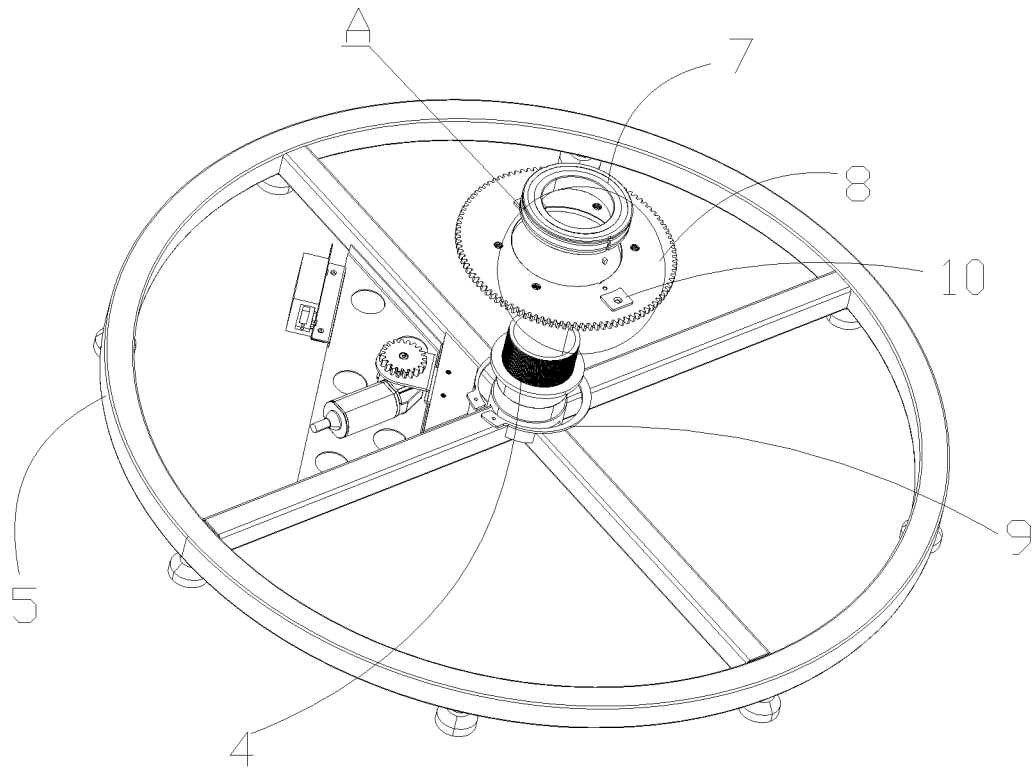
FIG. 9 is an exploded structural schematic diagram of the 360-degree camera device having atmosphere lamp after the supporting platform is removed according to one embodiment of the present disclosure.
Figure 10:
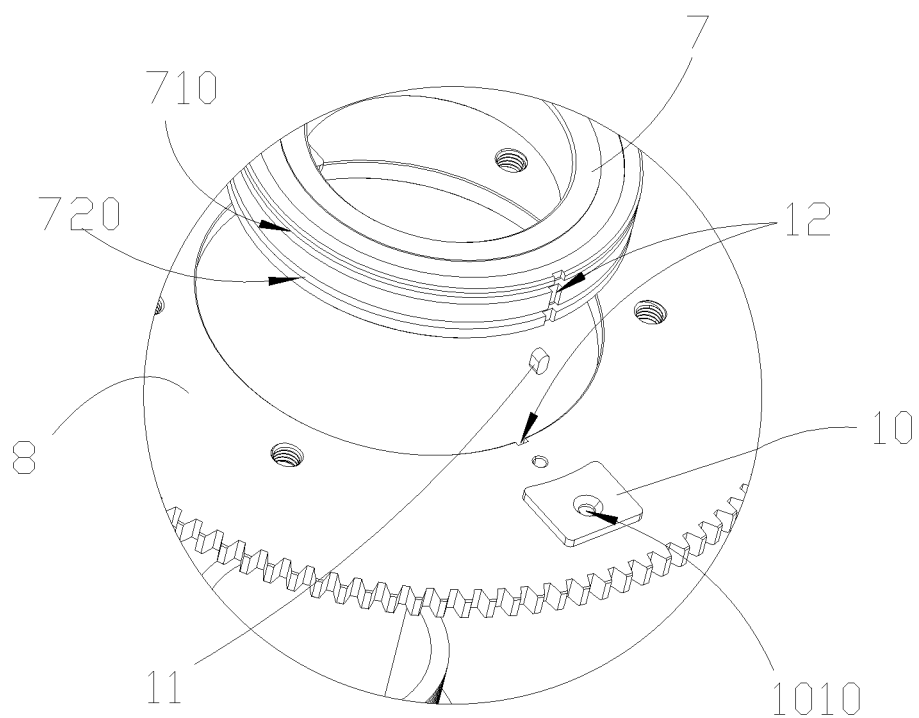
FIG. 10 is a schematic diagram of an enlarged view of portion A shown in FIG. 9.
Figure 11:
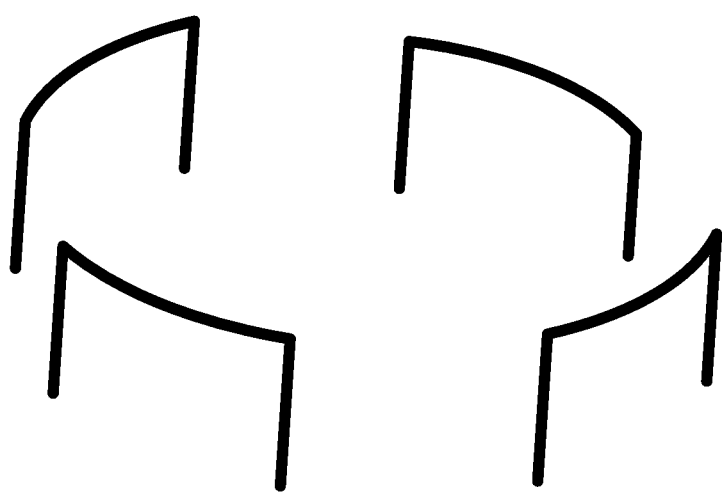
FIG. 11 is a schematic diagram of a welding connection contour of the supporting base and the supporting spindle of the 360-degree camera device having atmosphere lamp according to one embodiment of the present disclosure.

Referring to FIGS. 1-2, and FIG. 6, the 360-degree camera device further includes a fourth light source 6. A first end of the supporting spindle 4 is connected to the supporting platform 1. A second end of the supporting spindle 4 is connected to the supporting base 5. The fourth light source 6 includes a plurality of point-shaped light-emitting parts. The fourth light source 6 is substantially disposed in an annular shape and is disposed along an outer wall of the supporting base 5.

The fourth light source 6 plays a decorative role on the supporting base 5. The supporting base 5 plays a role of ground support for the supporting platform 1 by the supporting spindle 4.

Referring to FIGS. 1-2 and FIGS. 6-9, an external thread 420 is disposed on one end of the supporting spindle 4. The supporting platform 1 includes a connecting part 161 connected and matched with the external thread 420. A threaded through hole 162 is defined in the connecting part 161. A locking screw penetrates through the threaded through hole 162 and abuts against an outer wall of the external thread 420 to fasten connection between the supporting platform 1 and the supporting spindle 4, where the locking screw is not shown in the figures. The locking screw is configured to connect the supporting platform 1 with the supporting spindle 4 to achieve anti-loosening and anti-vibration purposes.

Optionally, the connecting part 161 is disposed on the second supporting element 160, and the connecting part 161 is an internal thread with respect to the external thread 420.

Referring to FIGS. 1-2, FIGS. 6-9, and FIG. 11, the supporting base 5 includes a supporting ring 510 and a supporting rod 520. The supporting rod 520 is connected to the supporting ring 510. A connecting groove 410 is defined on one end of the supporting spindle 4. The connecting groove 410 is capable of being clamped with the supporting rod 520. The supporting rod 520 and the supporting spindle 4 are connected and welded along a clamping position of the supporting rod 520 and the supporting spindle 4.

The connecting groove 410 capable of being clamped with the supporting rod 520 is defined on one end of the supporting spindle 4, the one end of the supporting spindle 4 is located on the supporting rod 520, the connecting groove 410 accommodates the supporting rod 520, and the supporting rod 520 is welded with the supporting spindle 4 along an edge contour of the connecting groove 410 and the supporting rod 520, which increases a length of a welding line, ensures firmness of connection between the supporting base 5 and the supporting spindle 4 after welding, prevents risk of weld fracture, further strengthens connection strength between the supporting base 5 and the supporting spindle 4, further strengthens overall stability of the 360-degree camera device, improves service safety factor of the 360-degree camera device, prolongs service life of the 360-degree camera device, and reduces maintenance cost of the 360-degree camera device.

In some embodiments, the supporting base 5 further includes an adjustable foot cup 530 to adjust an overall support height of the 360-degree camera device to the users, which meets requirements of the users.

Referring to FIG. 6 and FIGS. 8-10, the 360-degree camera device further includes a bearing 7, a transmission element 8, a clamping spring 9, a second connecting element 10, and a stop key 11. An inner ring of the bearing 7 is sleeved on an outer wall of the supporting spindle 4. The transmission element 8 is sleeved on an outer ring of the bearing 7. The bearing 7 includes a first connecting groove 710 and a second connecting groove 720. The clamping spring 9 and the second connecting element 10 are respectively connected with the first connecting groove 710 and the second connecting groove 720. The transmission element 8 is clamped and fixed between the clamping spring 9 and the second connecting element 10. A key groove 12 is defined between the bearing 7 and the transmission element 8. The stop key 11 is disposed in the key groove 12. The stop key 11 is limited between the clamping spring 9 and the second connecting element 10.

In some embodiments, the transmission element 8 is a gear or a belt pulley, a friction wheel, etc. An end surface of the transmission element 8 is connected to the rotating shooting bracket 14 of the 360-degree camera device. The transmission element 8 is sleeved on the outer ring of the bearing 7, and the inner ring of the bearing 7 is sleeved on the outer wall of the supporting spindle 4, so that the transmission element 8 is driven through a driving device, and the transmission element 8 drives the rotating shooting bracket 14 to rotate around the supporting platform 1.

However, in the prior art, connection between the transmission element 8 and the outer ring of the bearing 7 is unstable. First, a slipping situation is easy to happen between the transmission element 8 and the outer ring of the bearing 7, and when the transmission element 8 is driven through the driving device, the transmission element 8 cannot effectively rotate the rotating shooting bracket 14. Second, the transmission element 8 and the bearing 7 generate axial relative movement and even are separated from each other, and the connection is unreliable and unstable.

The first connecting groove 710 and the second connecting groove 720 are disposed on the bearing 7, the clamping spring 9 and the second connecting element 10 are respectively connected with the first connecting groove 710 and the second connecting groove 720, and the transmission element 8 is clamped and fixed between the clamping spring 9 and the second connecting element 10, which avoids axial relative movement of the transmission element 8 and the bearing 7.

The key groove 12 is defined between the bearing 7 and the transmission element 8, the stop key 11 is disposed in the key groove 12, the stop key 11 is limited between the clamping spring 9 and the second connecting part 10, which avoids a situation that the transmission element 8 and the outer ring of the bearing 7 easily slip. In addition, the stop key 11 is limited between the clamping spring 9 and the second connecting element 10, so that the stop key 11 is prevented from being separated from the key groove 12.

In some embodiments, the second connecting element 10 is roughly a sheet body. A third connecting hole 1010 is defined in the second connecting element 10. The second connecting element 10 is partially inserted into the first connecting groove 710. A locking screw penetrates through the third connecting hole 1010 and the transmission element 8 to fasten connection between the second connecting element 10 and the transmission element 8, where the locking screw is not shown in the figures. In some embodiments, the second connecting element 10 is further a clamping spring.

By means of the design, the transmission element 8 is capable of detaching and separating from the bearing 7, thus facilitating elements replacement and maintenance, avoiding permanent connection between the transmission element 8 and the bearing 7 to be difficult to replace the elements for maintenance later.

In some embodiments, the first light source 130, the second light source 2, the third light source 3, and the fourth light source 6 are red, green, blue (RGB) LED light strips, red, green, blue, white (RGBW) light strips and other types of light strips. The RGB LED light strips or the RGBW light strips have characteristics of bright colors, durability, long life span, good use effect, and good decorative effect. Under controlling of a controller, the first light source 130, the second light source 2, the third light source 3, and the fourth light source 6 are able to realize sequential transformation and flickering, jumping and gradient effects of various colors, by which, various light effects, such as horse racing, running water, meteor trailing, scanning, etc., have been realized to form diverse annular atmosphere, therefore providing experience having fantastic atmosphere effect and special visual impact for the users.

What is claimed is:

1. A 360-degree camera device having atmosphere lamp, comprising:
   a supporting platform;
   a supporting spindle;
   a supporting base; and
   a rotating shooting bracket;
   wherein the supporting platform comprises a first supporting element, a tempered glass, a first light source, and a reflecting mirror; the first supporting element is configured to support the tempered glass; the tempered glass is a single-sided perspective glass comprising a light-transmitting surface and a reflecting surface; an interval area is disposed between the tempered glass and the reflecting mirror, the reflecting mirror and the reflecting surface are oppositely disposed; and the first light source is disposed in the interval area.

2. The 360-degree camera device having atmosphere lamp according to claim 1, wherein the first light source is in a shape of graphics and/or characters.

3. The 360-degree camera device having atmosphere lamp according to claim 1, wherein the first light source comprises a plurality of point-shaped light-emitting parts, and the first light source is substantially disposed in an annular shape and disposed along edge contour of the tempered glass or the reflecting mirror.

4. The 360-degree camera device having atmosphere lamp according to claim 1, wherein the supporting platform comprises a second supporting element, the second supporting element is configured to support a center position of the tempered glass, and the first supporting element is configured to support an edge position of the tempered glass.

5. The 360-degree camera device having atmosphere lamp according to claim 4, wherein the supporting platform comprises a third supporting element, and the third supporting element is connected with the first supporting element and the second supporting element; and the third supporting element is configured to support the reflecting mirror.

6. The 360-degree camera device having atmosphere lamp according to claim 4, wherein the supporting platform comprises a first connecting element, the first connecting element is detachably connected to the first supporting element, and the first connecting element is configured to fasten connection between the tempered glass and the first supporting element.

7. The 360-degree camera device having atmosphere lamp according to claim 4, wherein the 360-degree camera device further comprises a second light source, the second light source comprises a plurality of point-shaped light-emitting parts, the second light source is disposed in the interval area, and the second light source is substantially disposed in an annular shape and is disposed along an outer wall of the second supporting element.

8. The 360-degree camera device having atmosphere lamp according to claim 6, wherein the 360-degree camera device further comprise a third light source, the third light source comprises a plurality of point-shaped light-emitting parts, and the third light source is substantially disposed in an annular shape and is disposed along an outer wall of the first connecting element.

9. The 360-degree camera device having atmosphere lamp according to claim 1, wherein the 360-degree camera device further comprise a fourth light source, a first end of the supporting spindle is connected to the supporting platform, and a second end of the supporting spindle is connected to the supporting base; the fourth light source comprises a plurality of point-shaped light-emitting parts, and the fourth light source is substantially disposed in an annular shape and is disposed along an outer wall of the supporting base.

10. The 360-degree camera device having atmosphere lamp according to claim 1, wherein an external thread is disposed on one end of the supporting spindle, the supporting platform comprises a connecting part connected and matched with the external thread; a threaded through hole is defined in the connecting part, and a locking screw penetrates through the threaded through hole and abuts against an outer wall of the external thread to fasten connection between the supporting platform and the supporting spindle.

11. The 360-degree camera device having atmosphere lamp according to claim 1, wherein the supporting base comprises a supporting ring and a supporting rod, the supporting rod is connected to the supporting ring, a connecting groove is defined on one end of the supporting spindle, the connecting groove is capable of being clamped with the supporting rod, and the supporting rod and the supporting spindle are welded and connected along a position where the supporting rod is clamped with the supporting spindle.

12. The 360-degree camera device having atmosphere lamp according to claim 1, wherein the camera device further comprises a bearing, a transmission element, a clamping spring, a second connecting element, and a stop key; an inner ring of the bearing is sleeved on an outer wall of the supporting spindle; the transmission element is sleeved on an outer ring of the bearing; the bearing comprises a first connecting groove and a second connecting groove; the clamping spring and the second connecting element are respectively connected with the first connecting groove and the second connecting groove, and the transmission element is clamped and fixed between the clamping spring and the second connecting element; a key groove is defined between the bearing and the transmission element, the stop key is disposed in the key groove, and the stop key is limited between the clamping spring and the second connecting element.

* * * * *